Nov. 18, 1930.                A. GRANDE                1,782,232
           ORNAMENTAL FOOD PACKAGE AND METHOD OF MAKING THE SAME
                           Filed Oct. 10, 1929

INVENTOR
Albert Grande

Patented Nov. 18, 1930

1,782,232

UNITED STATES PATENT OFFICE

ALBERT GRANDE, OF BOSTON, MASSACHUSETTS, ASSIGNOR TO BEAU IDEAL FOOD CO., OF BOSTON, MASSACHUSETTS, A CORPORATION OF MASSACHUSETTS

ORNAMENTAL FOOD PACKAGE AND METHOD OF MAKING THE SAME

Application filed October 10, 1929. Serial No. 398,792.

This invention relates to improvements in ornamental food packages and methods of making the same.

In preparing for the consumer mixed food products, such as chicken a la king, spaghetti and mushrooms, potato salad and pickles, etc., it has been the practice heretofore to introduce the mixed food stuff into its container without regard to the distribution of its ingredients. Accordingly, from an inspection of the container the character of its contents is not always apparent and a valuable opportunity of improving the appearance of the package is lost by allowing those characteristic or conspicuous food units which it may contain to be hidden by the mass.

In accordance with the method of my invention, it is proposed to arrange certain ingredient units of a mixed food stuff preliminarily in predetermined position upon the inner surface of a transparent container and then fill the container with the mixed food stuff in such a fashion as not to disturb the previously positioned and exposed units. Preferably, the units are sectioned or cut so that each presents a flat surface which may be conformed to the curved walls of a transparent jar and then caused to adhere thereto. Full opportunity is thus afforded for arranging the units conspicuously in any predetermined or fanciful design and the mixed food may be subsequently delivered to the jar so as to surround the previously placed units without in any way disturbing their arrangement. This is especially advantageous where the food stuff units are of an expensive nature such, for example, as mushrooms, because it utilizes each section so as to produce its maximum display effect and demonstrates conspicuously to the purchaser the desirability of the package and the richness of its contents.

Where such food units are employed as mushrooms, these may be cut into thin sections with parallel faces, then stewed so that they become somewhat sticky, and then caused to adhere to the inner surface of the jar by their natural juices. The sections thus treated may be arranged in parallel lines or in any other desired design, and in the complete package each section will thus be displayed conspicuously and to the best possible advantage.

Figure 1:
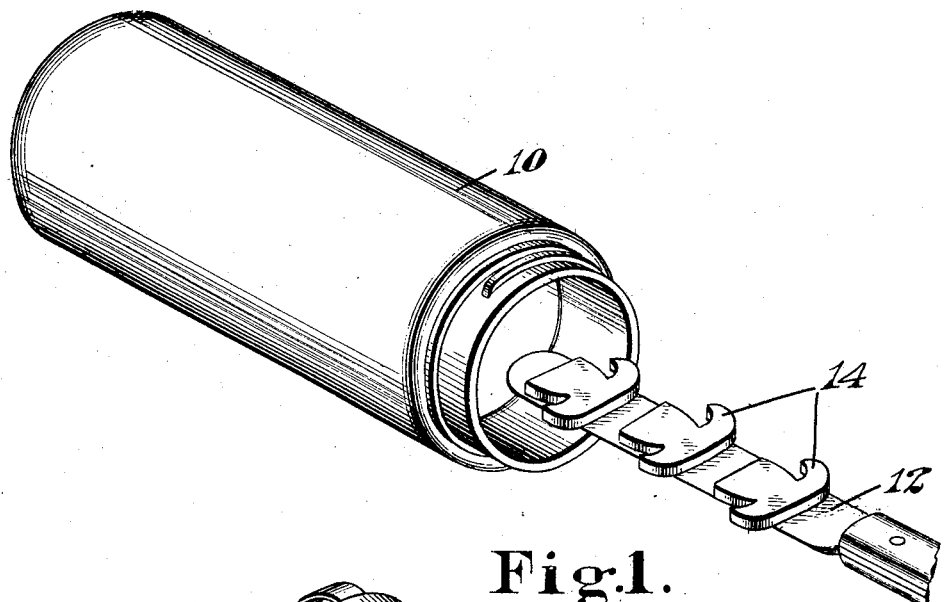

While the invention in one aspect consists in the novel method of making an ornamental food package, it includes within its scope the package herein shown as produced by the practice of the method. These and other features of the invention will be best understood and appreciated from the following description of the manner in which the method may be carried out in packaging spaghetti and mushrooms, illustrated in the accompanying drawings, in which Fig. 1 is a view in perspective illustrating the step of positioning the mushroom sections in the jar; and Fig. 2 is a view in perspective illustrating the step of filling the jar after the sections have been positioned.

The ingredients of the mixed food are first separately prepared. The mushrooms are cut into thin sections 14 or, if preferred, they may be divided so that each unit presents one flat face. The sectioned mushroom units are then stewed, with suitable sauce and flavoring, to render them most palatable, and in this process they become moist and slightly sticky.

Having prepared the mushroom sections as above outlined, they are arranged upon the inner walls of a glass container or jar 10 in any desired pattern as, for example, in straight parallel rows. This step may be carried out advantageously, as indicated in Fig. 1, in which the mushroom sections 14 are shown as symmetrically arranged in a row upon the blade 12 of a knife. The jar 10 being placed in horizontal position, the knife blade 12 is inserted with the mushroom sections 14 upon it, and the knife is then moved to bring the sections into engagement with the curved wall of the jar. The mushroom sections are thus conformed to the curvature thereof and disposed with their plane faces in intimate contact therewith. The sections are retained in whatever position they may be arranged by reason of their natural stickiness and by the suction caused by the exclusion of the air from between the two smooth faces. Having presented and arranged one row of mushroom sections, the jar is rotated perhaps 90° and another row presented in similar manner. It will be understood that having once positioned the mushroom sections, they will retain their position regardless of the position of the jar.

Figure 2:
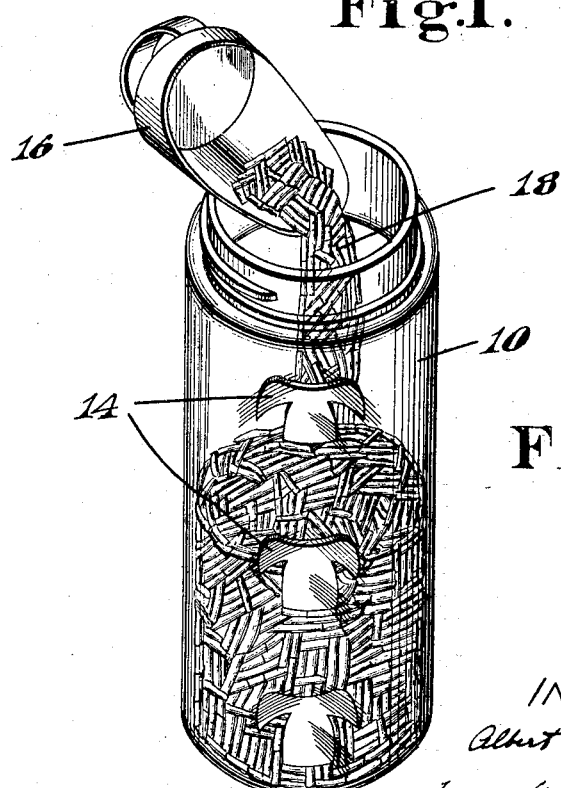

The jar is next placed in an upright position, as indicated in Fig. 2, and the other ingredient of the mixed food, in this case spaghetti 18, is delivered to the interior of the jar, as by a scoop 16. In this step of the method, spaghetti fills the interior of the jar, gradually rising and surrounding the mushroom sections 14 without any appreciable tendency to disturb their pre-arrangement. The spaghetti 18, of course, conforms to the inner surface of the jar 10 and occupies all the space between the mushroom sections. The result is that the dark mushroom sections stand out conspicuously in their arrangement on the inner surface of the jar against a background of the light-colored spaghetti.

It will be apparent that in preparing a food package as above outlined each mushroom section is utilized to the very best advantage by being positioned conspicuously where it is visible in its maximum dimensions, and that from both the standpoint of appearance and economy of manufacture a package of extremely valuable characteristics has been produced.

I have made no attempt to enumerate all the mixed food products which may be advantageously packaged in accordance with the method of my invention but I contemplate practicing it in connection with any mixed food product containing unitary ingredients which, by reason of shape or color, present a contrast to the mass of the food product or to other of its ingredients.

Having thus described my invention, what I claim as new and desire to secure by Letters Patent of the United States is:

1. The method of making an ornamental food package which consists in preliminarily arranging in a complete pattern upon the inner curved walls of a transparent jar a plurality of food stuff units, and then filling the jar with a food stuff of contrasting color without disturbing the previously established pattern of the units on the walls of the jar.

2. An ornamental food package comprising a transparent jar having thin sections of mushrooms arranged to form a design upon the walls thereof and independently adhering to the walls, and a filling of spaghetti visible between the mushroom sections.

3. An ornamental food package comprising a transparent jar having thin sections of food stuff units conformed to the inner surface of its walls and caused to adhere thereto in a predetermined design, and a filler of dissimilar food stuff surrounding said sections.

4. An ornamental food package comprising a transparent jar having flat-faced sections of food stuff units arranged in a pattern, each with its flat face out and pressed against the inner surface of the jar, and a filler of dissimilar appearing food stuff occupying the interior of the jar.

ALBERT GRANDE.